United States Patent
Walker et al.

(10) Patent No.: US 10,746,328 B2
(45) Date of Patent: Aug. 18, 2020

(54) BREECH LOCK COUPLING

(71) Applicant: Cameron International Corporation, Houston, TX (US)

(72) Inventors: Stephen John Walker, Houston, TX (US); David J. McWhorter, Magnolia, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 501 days.

(21) Appl. No.: 15/019,873

(22) Filed: Feb. 9, 2016

(65) Prior Publication Data

US 2016/0327191 A1  Nov. 10, 2016

Related U.S. Application Data (63) Continuation of application No. 12/933,861, filed as application No. PCT/US2009/041003 on Apr. 17, 2009, now Pat. No. 9,267,335.

(Continued)

(51) Int. Cl.
*F16L 15/08* (2006.01)
*E21B 17/01* (2006.01)
(Continued)

(52) U.S. Cl.
CPC .............. *F16L 15/08* (2013.01); *E21B 17/01* (2013.01); *E21B 17/043* (2013.01);
(Continued)

(58) Field of Classification Search
CPC .................................. F16L 15/08; F16L 15/04
(Continued)

(56) References Cited

U.S. PATENT DOCUMENTS

| | | |
|---|---|---|
| 1,535,294 A | 4/1925 | Collins |
| 1,691,851 A | 11/1928 | McCuean |

(Continued)

FOREIGN PATENT DOCUMENTS

| | | |
|---|---|---|
| EP | 0158455 | 10/1985 |
| EP | 1589188 | 10/2005 |
| GB | 2027150 | 2/1980 |

OTHER PUBLICATIONS

PCT International Search Report and Written Opinion; Application No. PCT/US2009/041003; dated Sep. 18, 2009; 14 pages.

(Continued)

*Primary Examiner* — Anna M Momper
*Assistant Examiner* — Fannie C Kee
(74) *Attorney, Agent, or Firm* — Helene Raybaud (57) ABSTRACT

There is provided a breech lock coupling for coupling riser sections together. The breech lock coupling may be used non-pre-loaded or pre-loaded according to the user's preferences. In addition, the breech lock coupling may be disassembled for inspection and maintenance and reassembled. A locking ring secures two coupling components together. The coupling components may be attached to opposite ends of the riser sections, such as via welding. The locking ring may be pre-attached to the first coupling component for easy storage and fast assembly. Assembly of the riser may be accomplished by inserting the second coupling component into the locking ring and the first coupling component, then rotating the locking ring with respect to the second component. Furthermore, the coupling may be pre-loaded by tightening fasteners on the locking ring to provide a more stable coupling. Unlike with traditional riser couplings, the pre-load fasteners may be tightened via hand-held tools.

16 Claims, 6 Drawing Sheets

Related U.S. Application Data (60) Provisional application No. 61/053,579, filed on May 15, 2008.

(51) Int. Cl.
*E21B 17/043* (2006.01)
*F16L 15/04* (2006.01)
*F16L 21/06* (2006.01)
*E21B 17/08* (2006.01)

(52) U.S. Cl.
CPC ............ *E21B 17/085* (2013.01); *F16L 15/04* (2013.01); *F16L 21/065* (2013.01); *F16L 2201/40* (2013.01)

(58) Field of Classification Search
USPC .................................................. 285/367, 420
See application file for complete search history.

(56) References Cited

U.S. PATENT DOCUMENTS

| | | | |
|---|---|---|---|
| 1,992,503 A | 2/1935 | Penick et al. | |
| 2,112,519 A | 3/1938 | Clo | |
| 2,318,590 A | 5/1943 | Boynton | |
| 2,473,102 A | 6/1949 | Krooss | |
| 2,818,055 A | 12/1957 | Hovde | |
| 3,423,111 A * | 1/1969 | Elsner | F16L 21/06 285/340 |
| 3,620,554 A | 11/1971 | Ward et al. | |
| 3,827,728 A | 8/1974 | Hynes | |
| 4,043,575 A | 8/1977 | Roth | |
| 4,097,069 A | 6/1978 | Morrill | |
| 4,108,479 A | 8/1978 | Straub | |
| 4,165,891 A | 8/1979 | Knox et al. | |
| 4,280,719 A | 7/1981 | Daniel et al. | |
| 4,281,863 A | 8/1981 | Hall | |
| 4,330,140 A | 5/1982 | Hampton | |
| 4,487,434 A | 12/1984 | Roche | |
| 4,491,346 A * | 1/1985 | Walker | E21B 33/038 285/18 |
| 4,496,173 A | 1/1985 | Roche et al. | |
| 4,557,508 A * | 12/1985 | Walker | E21B 33/038 285/315 |
| 4,647,254 A | 3/1987 | Baugh et al. | |
| 4,801,160 A | 1/1989 | Barrington | |
| 4,898,407 A | 2/1990 | Zeidler | |
| 5,590,913 A | 1/1997 | Morris et al. | |
| 5,911,446 A | 6/1999 | McLennan et al. | |
| 6,170,884 B1 | 1/2001 | McLennan et al. | |
| 7,341,281 B2 | 3/2008 | Guesnon et al. | |
| 2004/0113426 A1 | 6/2004 | Milberger et al. | |
| 2005/0206163 A1 | 9/2005 | Guesnon et al. | |
| 2010/0164223 A1 | 7/2010 | Curtiss et al. | |

OTHER PUBLICATIONS

Norwegian Office Action for NO Application No. 20101421 dated Jan. 23, 2017; 3 Pages.

Examination Report for the equivalent Brazilian patent application PI0912504-3 dated Aug. 15, 2018 with machine translation into English.

* cited by examiner

BREECH LOCK COUPLING

CROSS-REFERENCE TO RELATED APPLICATIONS

This application claims priority to U.S. Non-Provisional application Ser. No. 12/933,861 entitled "Breech Lock Coupling", filed on Sep. 21, 2010, which is herein incorporated by reference in its entirety, and which claims priority to PCT Application No. PCT/US2009/041003 entitled "Breech Lock Coupling", filed on Apr. 17, 2009, which is herein incorporated by reference in its entirety, and which claims priority to U.S. Provisional Patent Application No. 61/053,579, entitled "Breech Lock Coupling", filed on May 15, 2008, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Natural resources, such as oil and gas, are used as fuel to power vehicles, heat homes, and generate electricity, in addition to a myriad of other uses. Once a desired resource is discovered below the surface of the earth, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components and/or conduits, such as casings, trees, manifolds, and the like, that facilitate drilling and/or extraction operations.

When drilling for minerals, a drilling riser may be employed to convey drilling mud to a drill bit (e.g., for lubrication) and to convey the mud returns and drilling debris up from a bore hole. For example, a drill pipe carrying drilling mud from the surface to the drill bit may be disposed within the riser. Mud returns may travel back up the riser in the annular region between the drill pipe and the riser wall. The mud returns may also carry displaced rock away from the bore hole. Various other pipes may be disposed about the riser. For example, one or more choke/kill lines, mud boost lines, hydraulic lines, and so forth may be externally coupled to the riser. The riser may, in turn, be disposed within other tubing to protect the pipes from damage.

The riser generally consists of many sections coupled together. In some systems, the sections include couplings to connect the ends of the riser sections together. Current couplings generally include circular flanges disposed axially adjacent one another at the ends of the riser sections. The circular flanges are coupled together by bolts, which are tightened to couple the flanges axially together and to pre-load the couplings to mitigate fatigue due to load oscillations during use, for instance. Tightening the bolts is relatively time-consuming, taking over two minutes per coupling, and generally requires heavy machinery to provide adequate pre-load on the flange coupling.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed below, embodiments of the present invention provide a breech lock coupling which enables fast and easy coupling of riser sections. For example, the breech lock coupling may include a locking ring to couple riser sections together without the requirement of a pre-load. In addition, the breech lock coupling may acquire a pre-load by tightening the locking ring via a plurality of fasteners. The fasteners may be tightened by handheld equipment, thereby eliminating the need for heavy equipment to pre-load the riser couplings. In certain embodiments, the locking ring is completely removable, such that the coupling components may be easily inspected for fatigue. Furthermore, one or more external line connectors may be disposed about the breech lock coupling to enable load-sharing with the riser tube.

Figure 1:
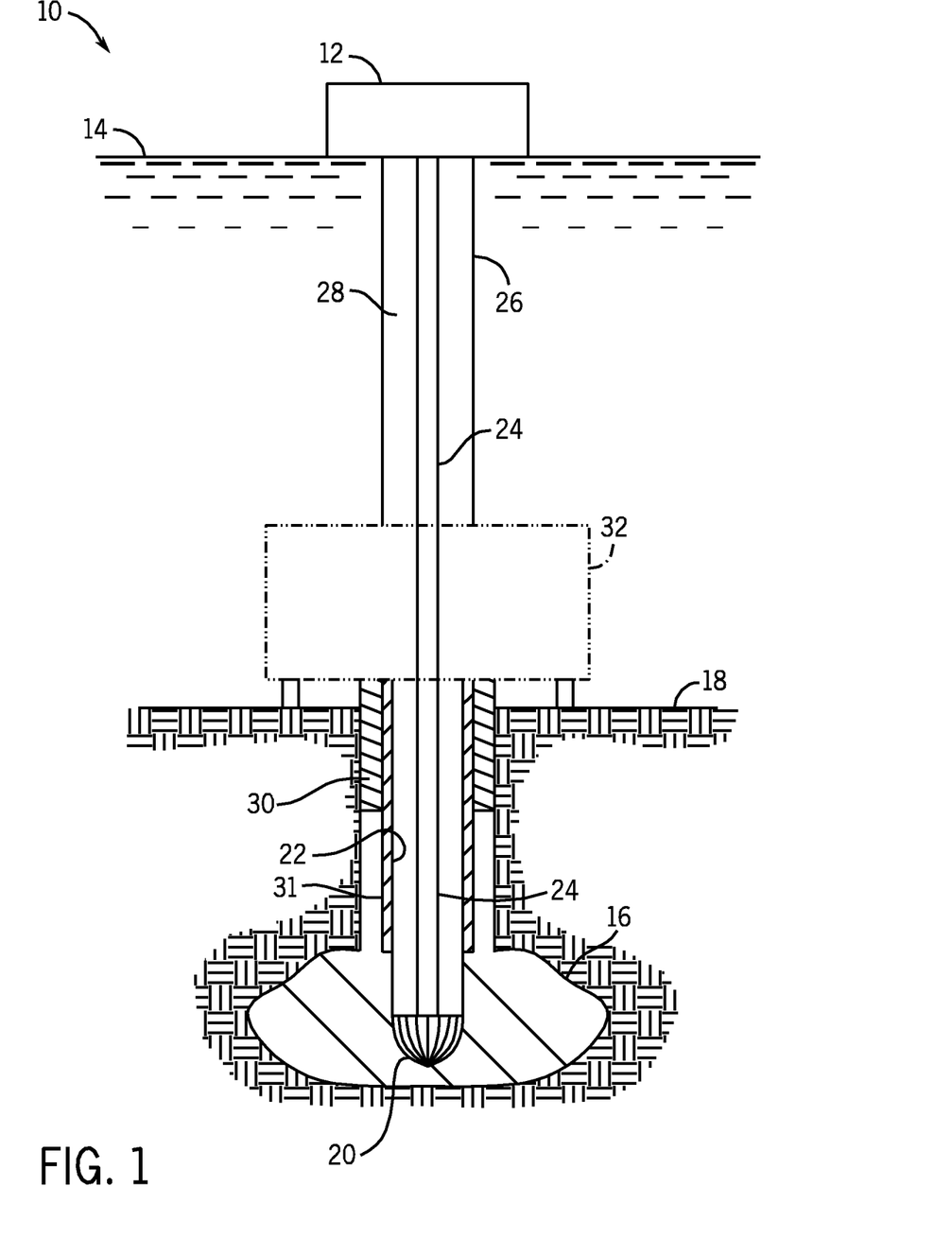
FIG. 1 is a diagram of an embodiment of a mineral extraction system.

Turning to FIG. 1, a schematic illustration provides a general overview of a mineral extraction system 10 in accordance with certain embodiments. A drilling rig 12 on a surface 14 (e.g., the ocean surface) is used to extract minerals, such as oil, gas, and natural gas, from a mineral deposit 16 located below ground 18 (e.g., the sea floor). To enable this extraction, a drill bit 20 is lowered from the drilling rig 12 to the ground 18, and a hole 22 (i.e., wellbore) is bored down to the mineral deposit 16. A drill pipe 24 supplies drilling mud from the drilling rig 12 to the drill bit 20 to lubricate the bit 20. The drilling mud also picks up debris displaced by the drill bit 20 and carries these returns back up to the drilling rig 12 through various tubing including a riser 26. The riser 26 may be situated around the drill pipe 24 such that the mud returns travel up the riser 26 through an annular portion 28 between the drill pipe 24 and the riser 26. One or more external pipes may be disposed about the riser 26 to carry additional fluids from the drilling rig 12, as described below.

The mineral extraction system 10 also includes a wellhead 30 disposed in the ground 18, an annular tube 31 (e.g., casing) disposed in the wellhead 30 and the hole 22 in the ground 18, and a stack 32 disposed above the ground 18. The annular tube 31 provides sidewall support in the hole 22 during drilling and extraction operations. The annular tube 31 also may provide protection and/or define additional annular passages, for example, for other lines or tubing. The stack 32 may include various control, drilling, and extraction equipment, such as, for example, a christmas tree, a blowout preventer, a tubing hanger, a casing hanger, hydraulic control valves, and so forth. For example, in the illustrated embodiment, the stack 32 may represent a blowout preventer (BOP) stack.

Figure 2:
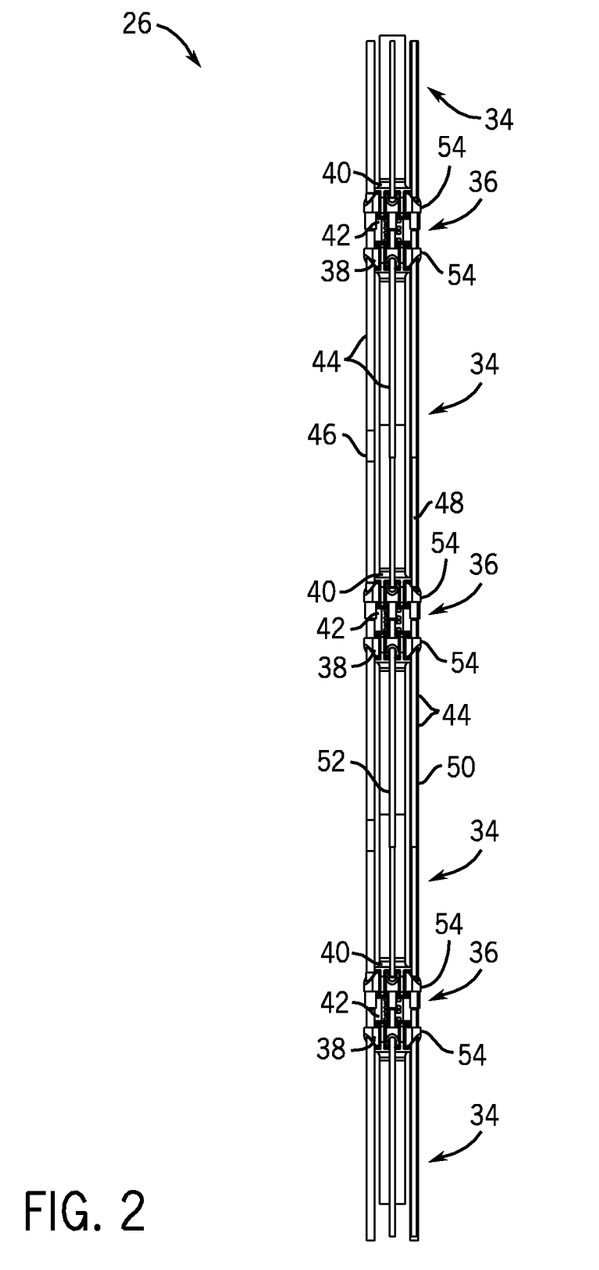
FIG. 2 is a perspective view of an embodiment of a riser for use in the mineral extraction system of FIG. 1.
Figure 3:
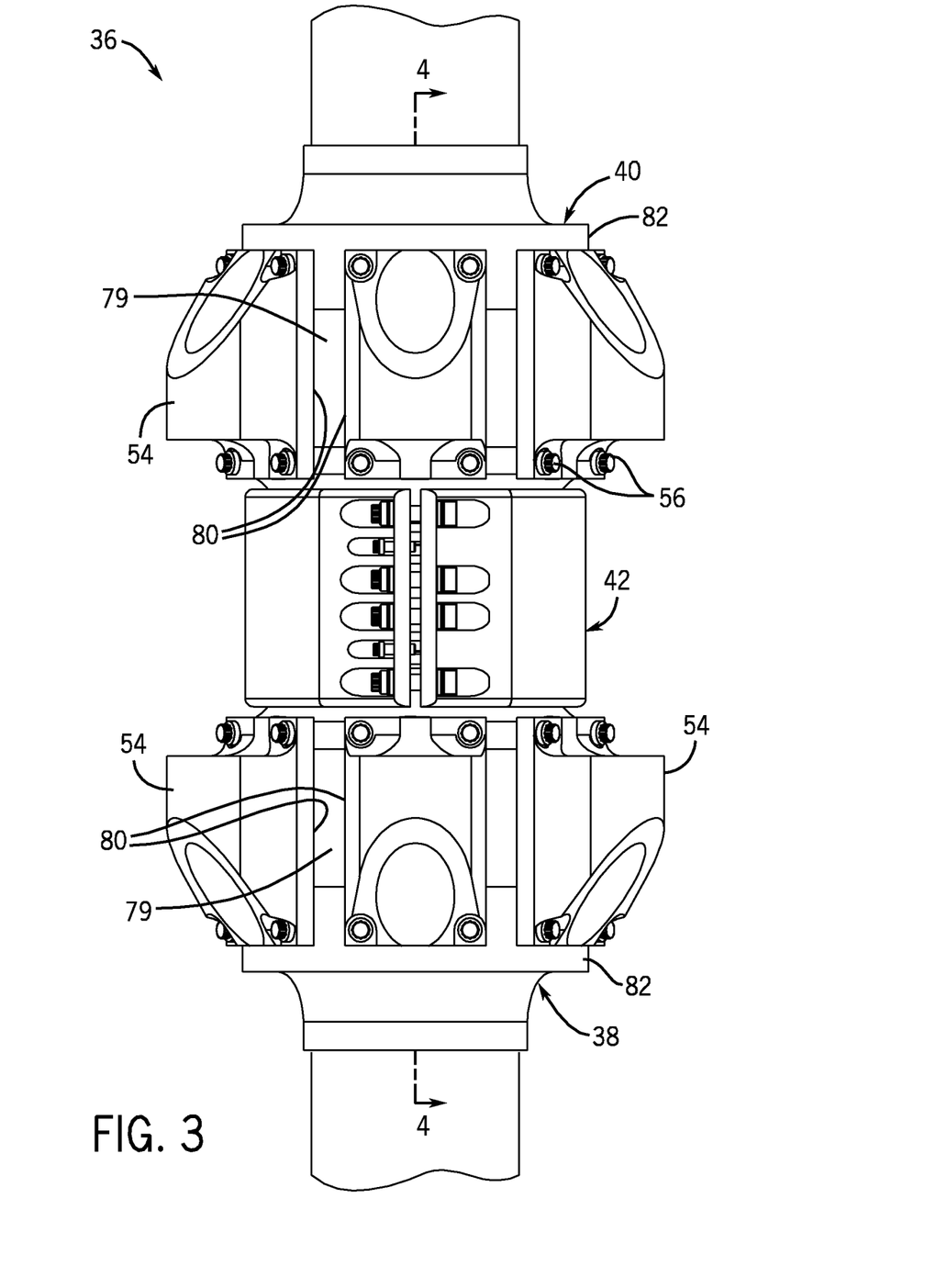
FIG. 3 is a perspective view of an embodiment of a breech lock coupling for coupling together the riser sections of FIG. 2.

FIG. 2 illustrates an embodiment of the riser 26 in more detail. Many riser sections 34 are often joined together to form the riser 26. A breech lock coupling 36, further illustrated in FIG. 3, is believed to enable fast and easy coupling of the riser sections 34 during installation of the riser 26. For example, the illustrated breech lock coupling 36 includes a pin portion 38 and a box portion 40 held together by a locking ring 42. Referring to both FIGS. 2 and 3, each riser section 34 has the pin portion 38 at one end and the box portion 40 at the other end. For example, the pin and box portions 38 and 40 may be welded to opposite ends of each riser section 34. When the pin portion 38 from one riser section 34 is joined with the box portion 40 of another riser section 34, the locking ring 42 may then be engaged to secure the joint, as described in more detail below.

As further illustrated in FIG. 2, one or more external tubes 44 may be disposed about the riser 26. For example, a choke line 46 may run alongside the riser 26 to enable depressurization of the well fluids. A kill line 48 may provide pressurized fluid to the stack 32 (FIG. 1) in the event that flow from the well needs to be terminated. In addition, a mud boost line 50 may be provided alongside the riser 26. The mud boost line 50 may supply additional drilling mud to the riser 26 above the drill bit 20 (FIG. 1). This additional mud increases the velocity of the mud returns, thereby reducing the settling-out of drilling debris from the mud returns. Other fluid lines, such as hydraulic fluid lines 52, may run alongside the riser 26 to provide various fluids to the stack 32 (FIG. 1). In the illustrated embodiment, the external tubes 44 may also provide additional support for the riser 26. That is, due to the design of the breech lock coupling 36, the load on the riser 26 resulting from the weight of the riser 26 and components attached thereto is believed to be distributed, or shared, between the riser 26 and the external tubes 44.

The external tubes 44 may be coupled to the riser 26 via supports 54 disposed about the breech lock couplings 36. For example, at the ends of each riser section 34, the tubes 44 are secured to the pin portion 38 and/or the box portion 40 of the breech lock couplings 36 via supports 54, as illustrated in FIG. 3. The illustrated supports 54 are secured to the coupling portions 38 and 40 via fasteners 56 (e.g., bolts). In addition, clamps (not shown) may secure the tubes 44 to the riser sections 34 between the ends.

Figure 4:
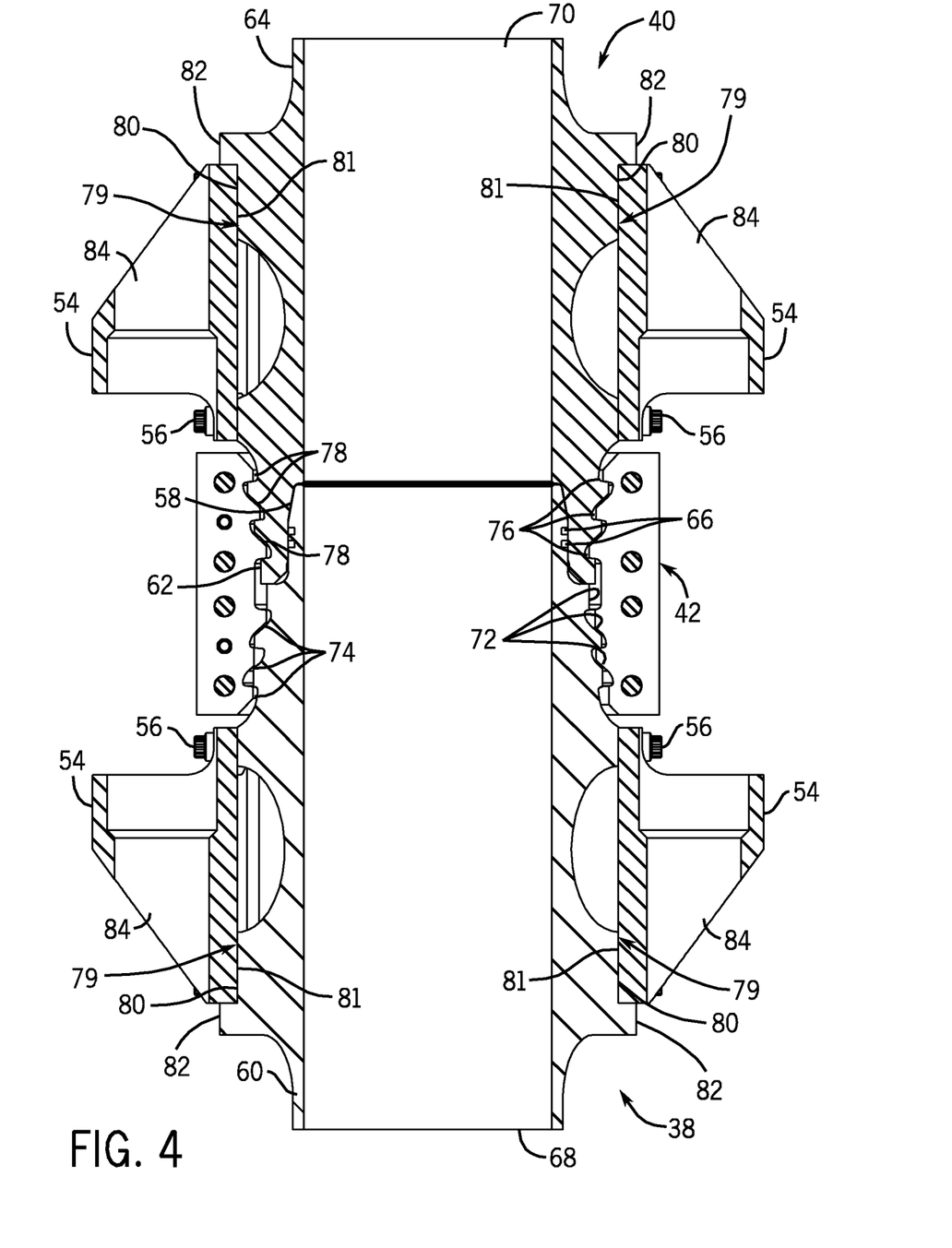
FIG. 4 is a cross-sectional view of the breech lock coupling of FIG. 3 taken along line 4-4.

FIG. 4 is a cross-section of the breech lock coupling 36 of FIG. 3 taken along a line 4-4, in accordance with certain embodiments. The pin portion 38 of the coupling 36 includes a coupling end 58 and a pipe end 60. The pipe end 60 may be inserted into and welded to a riser section 34 (FIG. 2). Similarly, the box portion 40 of the coupling 36 includes a coupling end 62 and a pipe end 64. The pipe end 64 also may be inserted into and welded to a riser section 34 (FIG. 2). The coupling ends 58 and 62 are fitted together by advancing the pin portion 38 into the box portion 40. One or more seals 66 (e.g., ring seals) may be disposed about the coupling end 58 of the pin portion 38 to enable a fluid-tight fit between the coupling portions 38 and 40. As discussed above, fluid, such as mud returns, flow through the breech lock coupling 36 via bores 68 and 70 in the pin portion 38 and the box portion 40, respectively.

Although the seals 66 may provide an interference fit between the pin portion 38 and the box portion 40, the locking ring 42 secures the two portions together. As illustrated in FIG. 4, the pin portion 38 includes rows of teeth 72 which protrude radially outward near the coupling end 58. Cooperating teeth 74 protrude radially inward from the coupling ring 42 to mate with the teeth 72. Similarly, the box portion 40 has rows of teeth 76 which protrude radially outward and cooperate with rows of teeth 78 protruding radially inward from the coupling ring 42. As will be described in more detail below, the cooperating teeth 72 and 74 may be different from the cooperating teeth 76 and 78.

In addition to securing riser sections 34 together, the breech lock coupling 36 serves to secure the external tubes 44 to the riser 26 (FIG. 2). The external tube supports 54 may be fastened to the pin portion 38 and the box portion 40 via the fasteners 56. Each support 54 may be secured to exterior surfaces 79 of the pin portion 38 and the box portion 40. In the illustrated embodiment, the exterior surfaces 79 include flat surfaces 80 to enable flush mounting with corresponding flat surfaces 81 of the external tube supports 54. In another embodiment, the surfaces 80 and 81 may be curved (e.g., part of cylindrical shape) rather than flat, such that the surfaces 80 and 81 are still configured to mount the external supports 54 flush with the exterior surfaces 79 of the pin portion 38 and the box portion 40. Additionally, the external tube supports 54 may be mounted to the exterior surfaces 79 without a flush mount. That is, the flat surfaces 81 on the external tube supports 54 may be secured to a curved exterior surface 79 of pin portion 38 and the box portion 40. Shoulders 82 on the pin portion 38 and the box portion 40 may enable load sharing between the external tubes 44 and the riser 26 (FIG. 2). For example, the external tube supports 54 abut the shoulders 82 such that axial forces are distributed among the pin portion 38, the box portion 40, the riser 26, and the external tubes 44. Thus, axial forces in the riser 26 can be shared among the various external tubes 44 via the engagement of the shoulders 82 with the external tube supports 54. Furthermore, each support 54 has a bore 84 running therethrough generally parallel to the bores 68 and 70 of the portions 38 and 40, respectively. The bores 84 may receive the external tubes 44 (FIG. 2).

Figures 5, 6:
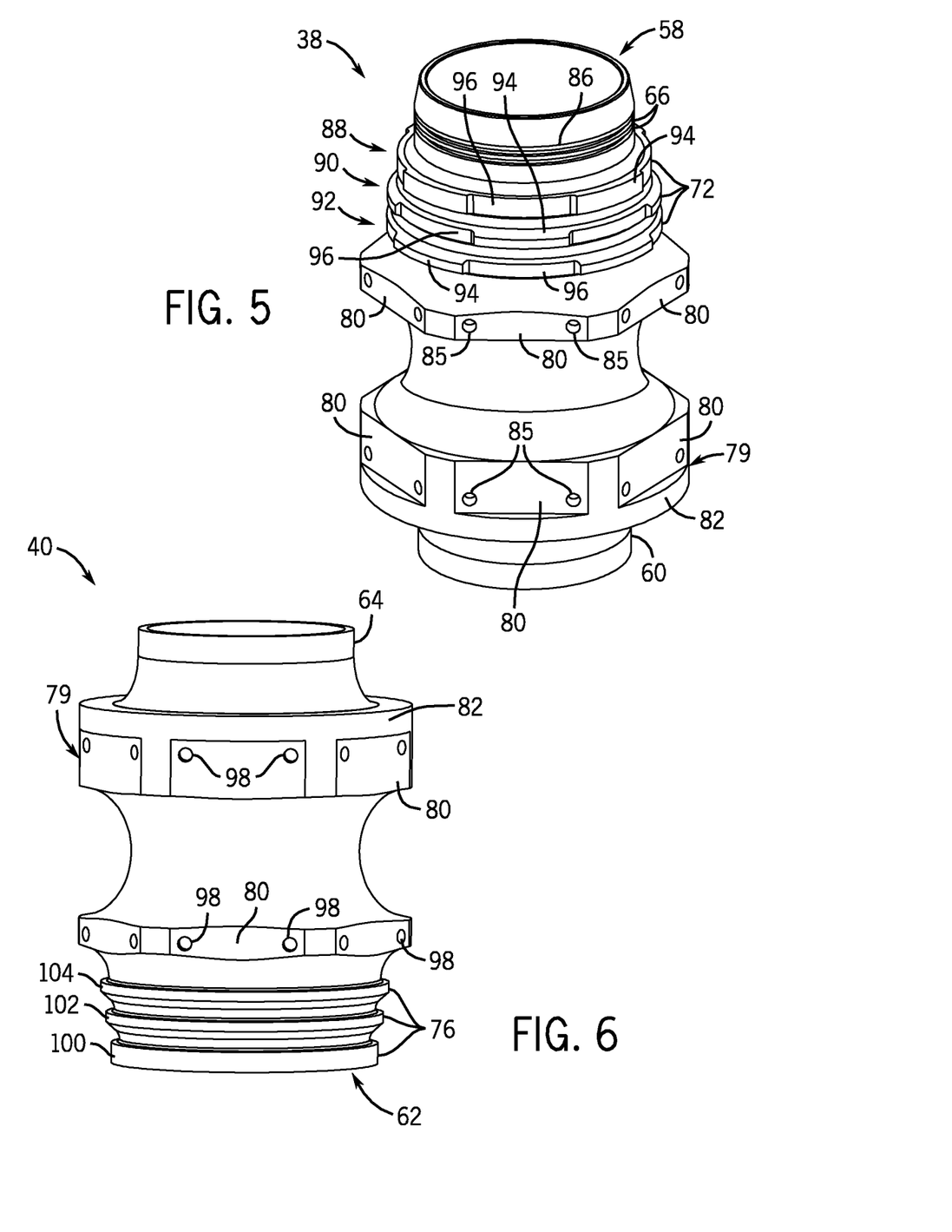
FIG. 5 is a perspective view of a pin portion of the breech lock coupling of FIG. 3.
FIG. 6 is a perspective view of a box portion of the breech lock coupling of FIG. 3.
Figure 7:
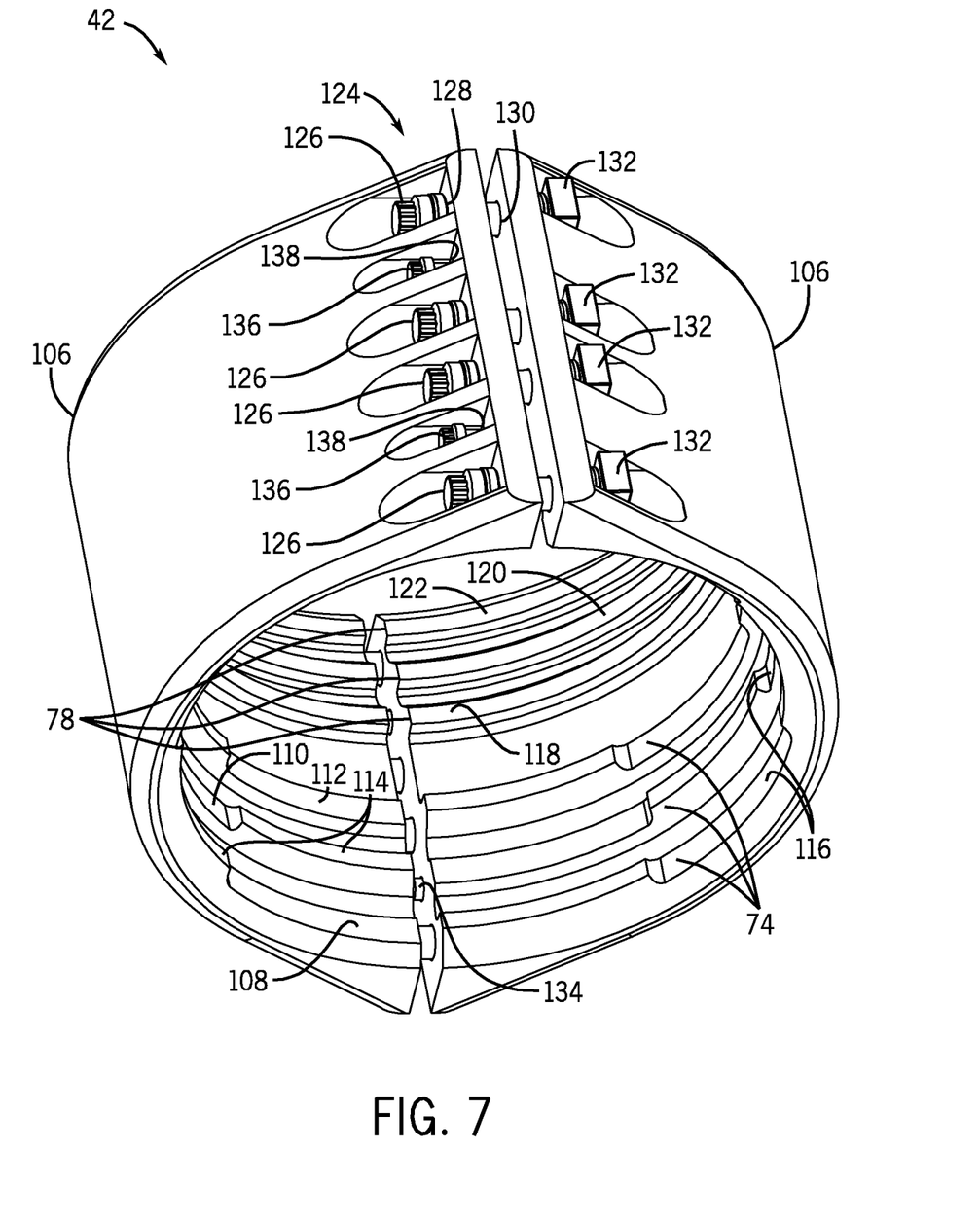
FIG. 7 is a perspective view of a locking ring of the breech lock coupling of FIG. 3.

Turning to FIGS. 5-7, embodiments of the components of the breech lock coupling 36 are individually illustrated in more detail. FIG. 5 illustrates the pin portion 38 of the coupling 36. The pin portion 38 has a generally cylindrical shape with the flat surfaces 80 optionally providing flush securement areas for the corresponding flat surfaces 81 of the external tube supports 54 (FIG. 3). Holes 85 (e.g., threaded holes) in the exterior surface 79 may receive the fasteners 56 to secure the supports 54 to the pin portion 38 (FIG. 3). As discussed above, the shoulder 82 enables load sharing between the riser 26 and the external tubes 44 (FIG. 2). The coupling end 58 of the pin portion 38 includes the seals 66 (e.g., ring seals). The seals 66 may be secured to the pin portion 38 via small insets 86. The insets 86 are shallow enough that the seals 66 may protrude radially outward to contact the interior of the box portion 40 (FIG. 3).

The teeth 72 which protrude radially outward from the pin portion 38 near the coupling end 58 are configured to removably interlock with the teeth 74 of the locking ring 42 (FIG. 3). To facilitate this interlocking function, the teeth 72 may include multiple rows of teeth 88, 90, and 92, each having one or more protrusions 94 and one or more indentations 96. The protrusions 94 and the indentations 96 on a given row 88, 90, or 92 may alternate around the circumference of the pin portion 38. In addition, the protrusions 94 and the indentations 96 may alternate from one row to the next (e.g., row 88 to row 90 or row 90 to row 92) to form a staggered pattern of protrusions 94 around the coupling end 58 of the pin portion 38.

Furthermore, the protrusions 94 and/or the rows 88, 90, and 92 may extend radially outward to different distances. For example, the row 88 (and the protrusions 94 thereon) may extend radially outward from the pin portion 38 to a lesser extent than the rows 90 and 92 (and the protrusions 94 thereon). Put another way, the maximum diameter of the row 88 (i.e., the distance from the outer surface of one protrusion 94 to the outer surface of an opposite protrusion 94 on the row 88) may be less than that of the rows 90 and/or 92. Similarly, the row 90 may have a smaller maximum diameter than the row 92. The rows 88, 90, and 92 may have similar minimum diameters (i.e., the distance from the outer surface of one indentation 96 to the outer surface of an opposite indentation 96), with only the radial height of the protrusions 94 on each row varying (e.g., the radial distance from the outer surface of the indentations 96 to the outer surface of the protrusions 94 on a given row 88, 90, or 92). In another embodiment, the protrusions 94 may have similar radial heights, with the rows 88, 90, and 92 having increasing minimum diameters. In yet another embodiment, the minimum diameters of the rows 88, 90, and 92 may vary along with the radial height of the protrusions 94.

Turning to FIG. 6, the box portion 40 of the breech lock coupling 36 has many features similar to that of the pin portion 38, in accordance with certain embodiments. The box portion 40 has a generally cylindrical shape. The coupling end 62 may receive the coupling end 58 of the pin portion 38 (FIG. 5). In addition, the exterior surface 79 may include holes 98 (e.g., threaded holes) to receive the fasteners 56 and secure the external tube supports 54 to the box portion 40 (FIG. 3). The optional flat surfaces 80 in the illustrated embodiment may provide flush securement areas for the corresponding flat surfaces 81 of the external tube supports 54 (FIG. 2). As discussed above, the shoulder 82 enables load sharing between the riser 26 and the external tubes 44 (FIG. 2).

The teeth 76 are configured to receive the teeth 78 on the locking ring 42 (FIG. 3). In contrast to the teeth 72 on the pin portion 38 (FIG. 5), the teeth 76 on the box portion 40 may be continuous protrusions (i.e., a complete generally circular geometry) extending radially outward from the coupling end 62. That is, each row 100, 102, and 104 may be uniform around the entire circumference of the box portion 40. The rows 100, 102, and 104 may extend radially outward to different extents relative to one another. That is, the diameter of the row 100 may be less than that of the row 102, which may be less than that of the row 104. This configuration facilitates attachment and removal of the locking ring 42, as described in more detail below.

The locking ring 42 is illustrated in more detail in FIG. 7. The ring 42 has a generally cylindrical shape made up by coupling together two ring portions 106 (i.e., not an entire circular or annular geometry). In one embodiment, the ring portions 106 may be identical or similar such that each ring 42 can be formed by coupling together any two ring portions 106. In another embodiment, the ring portions 106 may be complimentary but different such that one portion 106 is coupled to its complimentary portion 106 rather than an identical portion 106. In addition, the two ring portions 106 which make up the locking ring 42 may each be semicircular (i.e., 180 degrees), or one portion 106 may have a first arc length (i.e., less than 180 degrees) and the second portion 106 may have a second arc length (i.e., greater than 180 degrees), which collectively form a generally full 360 degree circle. In another embodiment, more than two ring portions 106 may be coupled together to form the circular locking ring 42 (e.g., three portions 106 each having arc lengths of 120 degrees, four portions 106 each having arc lengths of 90 degrees, one portion 106 having an arc length of 180 degrees and two portions 106 each having arc lengths of 90 degrees, etc.).

As discussed above, the teeth 74 and 78 enable connection of the ring 42 with the pin portion 38 and the box portion 40, respectively (FIG. 3). As with the teeth 72 (FIG. 5), the teeth 74 may include multiple rows of teeth 108, 110, and 112 extending radially inward from an internal surface of the ring 42. Each row 108, 110, and 112 may have one or more protrusions 114 and one or more indentations 116. The protrusions 114 and the indentations 116 on a given row 108, 110, or 112 may alternate around the inner circumference of the locking ring 42. In addition, the protrusions 114 and the indentations 116 may alternate from one row to the next (e.g., row 108 to row 110 or row 110 to row 112) to form a staggered pattern of protrusions 114 and indentations 116, as illustrated in FIG. 7.

Also, as with the teeth 72 (FIG. 5), the protrusions 114 and/or the rows 108, 110, and 112 may extend radially inward to different distances. For example, the row 108 (and the protrusions 114 thereon) may extend radially inward to a lesser extent than the rows 110 and 112 (and the protrusions 114 thereon). In this configuration, the minimum diameter of the row 108 (i.e., the distance from the inner surface of one protrusion 114 to the inner surface of an opposite protrusion 114 on the row 108) may be greater than that of the rows 110 and/or 112. Similarly, the row 110 may have a greater minimum diameter than the row 112. The rows 108, 110, and 112 may have similar maximum diameters (i.e., the distance from the inner surface of one indentation 116 to the inner surface of an opposite indentation 116), with only the radial height of the protrusions 114 on each row varying. In another embodiment, the protrusions 114 may have similar radial heights, with the rows 108, 110, and 112 having decreasing maximum diameters. In yet another embodiment, the maximum diameters of the rows 108, 110, and 112 may vary in addition to the radial height of the protrusions 114.

The teeth 78, like the teeth 76 (FIG. 6), may be continuous protrusions extending radially inward. For example, each row 118, 120, and 122 may be generally uniform around the entire inner circumference of the locking ring 42. The rows 118, 120, and 122 may extend radially inward to different distances relative to one another. That is, the diameter of the row 118 may be less than that of the row 120, which may be less than that of the row 122. In the illustrated embodiment, the locking ring 42 may be coupled to the box portion 40 of each riser section 34 prior to installation of the riser 26 (FIG. 2). By pre-assembling part of the breech lock coupling 36, the riser sections 36 may be coupled together faster and more efficiently. The teeth 76 and 78 may cooperate to secure the locking ring 42 to the box portion 40 while still enabling rotation of the ring 42 with respect to the box portion 40 (FIG. 6).

In addition, the teeth 74 may be configured to couple with the teeth 72 of the pin portion 38 (FIG. 5) via simple rotation of the locking ring 42 with respect to the pin portion 38. That is, the configuration of the teeth 72 and 74 may enable the teeth 74 to pass over the teeth 72 when in proper orientation relative to one another. The proper orientation may be, for example, such that the projections 114 on the row 108 are in line with the indentations 96 on the row 88 (FIGS. 5 and 7). The projections 114 on the rows 110 and 112 would also be in line with the indentations 96 on the rows 90 and 92, respectively. In addition, the indentations 116 on the rows 108, 110, and 112 would be in line with the projections 94 on the respective rows 88, 90, and 92. The rows 108, 110, and 112 may then be advanced just past the rows 88, 90, and 92, respectively. Because the locking ring 42 is pre-attached to the box portion 40, advancing the pin portion 38 into the locking ring 42 also serves to advance the pin portion 38 into the box portion 40.

Rotation of the locking ring 42 with respect to the pin portion 38 may then alter the orientation of the teeth 72 with respect to the teeth 74 such that the pin portion 38 may no longer be pulled axially out of the locking ring 42. For example, the projections 94 on the row 88 may be axially in line with the projections 114 on the row 108. Because the row 108 was advanced axially past the row 88, the projections 94 and 114 may stop the pin portion 38 and the locking ring 42 from being disengaged in an axial direction. Similarly, the projections 94 and 114 on the rows 90 and 110 and the rows 92 and 112, respectively, may further secure the pin portion 38 and the locking ring 42 together. The degree of rotation of the ring 42 required to lock the coupling 36 may be dependent on the configuration of the teeth 72 and 74. That is, the locking ring 42 needs to be rotated only to the degree that the projections 94 are aligned with the adjacent projections 114 such that the pin portion 38 may not be disengaged from the locking ring 42. This degree of rotation may be based on the number of projections 94 and 114 which are disposed about each row of teeth 72 and 74, respectively. For example, if the rows of teeth 72 and 74 each have four projections 94 and 114 and four indentations 96 and 116, respectively, as in the illustrated embodiment, the degree of rotation of the ring 42 with respect to the pin portion 38 required to lock the coupling 36 would be approximately 45 degrees. Similarly, if there are only two projections 94 and 114 and two indentations 96 and 116 on each of the rows of teeth 72 and 74, respectively, the ring 42 would be rotated 90 degrees with respect to the pin portion 38 to lock the coupling 36. A securement device (not shown) may hold the locking ring 42 in place relative to the pin portion 38 and the box portion 40 such that the riser coupling 36 may be used in the non-pre-loaded configuration.

As described, engagement of the locking ring 42 with the teeth 72 and 76 may secure the pin portion 38 and the box portion 40 together, but the coupling 36 is not pre-loaded. While the coupling 36 may be used in this manner, it may at times be desirable to pre-load the coupling 36 to reduce fatigue on the coupling 36 during use. Accordingly, the locking ring 42 may be tightened around the pin portion 38 and the box portion 40 via one or more fasteners 124. The fasteners 124 may be, for example, bolts which are passed tangentially or circumferentially through one ring portion 106 and engage threaded receptacles (not shown) in the other portion 106. In another embodiment, illustrated in FIG. 7, the fasteners may be bolts 126 which are passed through holes 128 in one ring portion 106 and corresponding holes 130 in the other ring portion 106 and are secured by nuts 132. The bolts 126 may be tightened to secure the locking ring 42 around the pin portion 38 and the box portion 40. The size and position of the bolts 126 enable tightening via a hand-held tool, thereby reducing the need for heavy equipment during installation of the riser 26 (FIG. 2).

By tightening the locking ring 42, the breech lock coupling 36 may be pre-loaded with a force roughly equal to the force with which the riser sections 34 are pulled apart during normal usage of the riser 26 (FIG. 2). In addition, the fasteners 124 may be disengaged to remove the locking ring 42 and inspect the components of the coupling 36 for fatigue or damage. The fasteners 124 may be disengaged and the ring 42 taken apart without disengaging the pin portion 38 from the box portion 40. Due to environmental wear (e.g., rust, deposits, etc.), the ring 42 may stick together even after removal of the fasteners 124. To facilitate removal of the ring 42, jack screws 136 may be disposed in holes 138 on one side of the ring portion 106. The opposite side of the ring portion 106 may not contain corresponding holes. The portions 106 may then be jacked apart by advancing the jack screws 136 into the holes 138, thereby pushing against the adjoined ring portion 106.

While the invention may be susceptible to various modifications and alternative forms, specific embodiments have been shown by way of example in the drawings and have been described in detail herein. However, it should be understood that the invention is not intended to be limited to the particular forms disclosed. For example, although in the embodiment described herein the locking ring 42 is pre-attached to the box portion 40, it should be understood that the coupling features may be reversed such that the locking ring 42 is pre-attached to the pin portion 38 and coupled to the box portion 40 via rotation. Indeed, the invention is to cover all modifications, equivalents, and alternatives falling within the spirit and scope of the invention as defined by the following appended claims.

The invention claimed is:

1. A breech lock coupling, comprising:
    a removable locking ring configured to secure first and second components together without pre-loading wherein the removable locking ring comprises two separable ring portions, the two separable ring portions both comprise first and second coupling sections configured to couple the removable locking ring to the first and second components, wherein the first coupling sections comprise a first configuration of teeth and the second coupling sections comprise a second configuration of teeth, and wherein the first configuration of teeth is different than the second configuration of teeth; and
    a plurality of fasteners coupled to the removable locking ring and substantially crosswise to a longitudinal axis of the removable locking ring, wherein the plurality of fasteners are configured to couple the two separable ring portions together and to selectively apply a pre-load force to the removable locking ring;
    wherein the first component comprises a pin portion and the second component comprises a box portion configured to receive the pin portion.

2. The breech lock coupling of claim 1, wherein the two separable ring portions are substantially identical semi-circular ring portions.

3. The breech lock coupling of claim 1, wherein the two separable ring portions have different arc lengths that complement one another to complete a circular geometry of the removable locking ring.

4. The breech lock coupling of claim 1, comprising a jack component configured to assist in separation of the two separable ring portions.

5. The breech lock coupling of claim 1, comprising a seal between the first and second components.

6. The breech lock coupling of claim 1, comprising external tube supports coupled to the first and second components and configured to enable load sharing between a riser coupled together by the breech lock coupling and one or more external tubes secured to the riser by the external tube supports.

7. A breech lock coupling, comprising:
a removable locking ring configured to secure first and second components together without pre-loading wherein the removable locking ring comprises two separable ring portions, the two separable ring portions both comprise first and second coupling sections configured to couple the removable locking ring to the first and second components, wherein the first coupling sections comprise a first configuration of teeth and the second coupling sections comprise a second configuration of teeth, and wherein the first configuration of teeth is different than the second configuration of teeth; and
a plurality of fasteners coupled to the removable locking ring and substantially crosswise to a longitudinal axis of the removable locking ring, wherein the plurality of fasteners are configured to couple the two separable ring portions together and to selectively apply a pre-load force to the removable locking ring;
wherein the first configuration of teeth comprises a plurality of rows of continuous teeth, each tooth extending continuously around an axis to form a circular protrusion.

8. The breech lock coupling of claim 1 or 7, wherein the second configuration of teeth comprises a plurality of rows of staggered teeth.

9. The breech lock coupling of claim 1 or 7, wherein the plurality of fasteners comprise bolts advanced through the removable locking ring and secured by nuts.

10. The breech lock coupling of claim 1 or 7, wherein the plurality of fasteners comprise bolts advanced into and secured by threaded holes in the removable locking ring.

11. A system, comprising:
a first riser section, the first riser section comprises a pin portion at a first end;
a second riser section, the second riser section comprises a box portion at a second end, wherein the pin portion is configured to be inserted into the box portion; and
a breech lock coupling that couples together the first and second riser sections, wherein the breech lock coupling comprises a first separable ring portion and a second separable ring portion that couple together to form a ring about the pin portion of the first riser section and the box portion of the second riser section to couple the first riser section to the second riser section, and wherein the first separable ring portion couples directly to the pin portion and the box portion and the second separable ring portion couples directly to the pin portion and the box portion;
wherein the breech lock coupling comprises a first coupling section having one or more rows of segmented teeth that have teeth and indentions that are staggered from one row to another.

12. The system of claim 11, wherein the one or more rows of segmented teeth are circumferentially spaced apart from one another.

13. The system of claim 12, wherein the breech lock coupling comprises a second coupling section having one or more rows of continuous teeth.

14. The system of claim 11, wherein the one or more rows of segmented teeth include first, second, and third rows.

15. The system of claim 11, wherein the breech lock coupling is circumferentially split into at least first and second coupling portions disposed circumferentially about an axis.

16. The system of claim 15, comprising one or more fasteners coupling together the first and second coupling portions.

* * * * *